Oct. 8, 1963   D. M. PETERSON ETAL   3,106,144
CAMERA
Filed Aug. 5, 1960   2 Sheets-Sheet 1
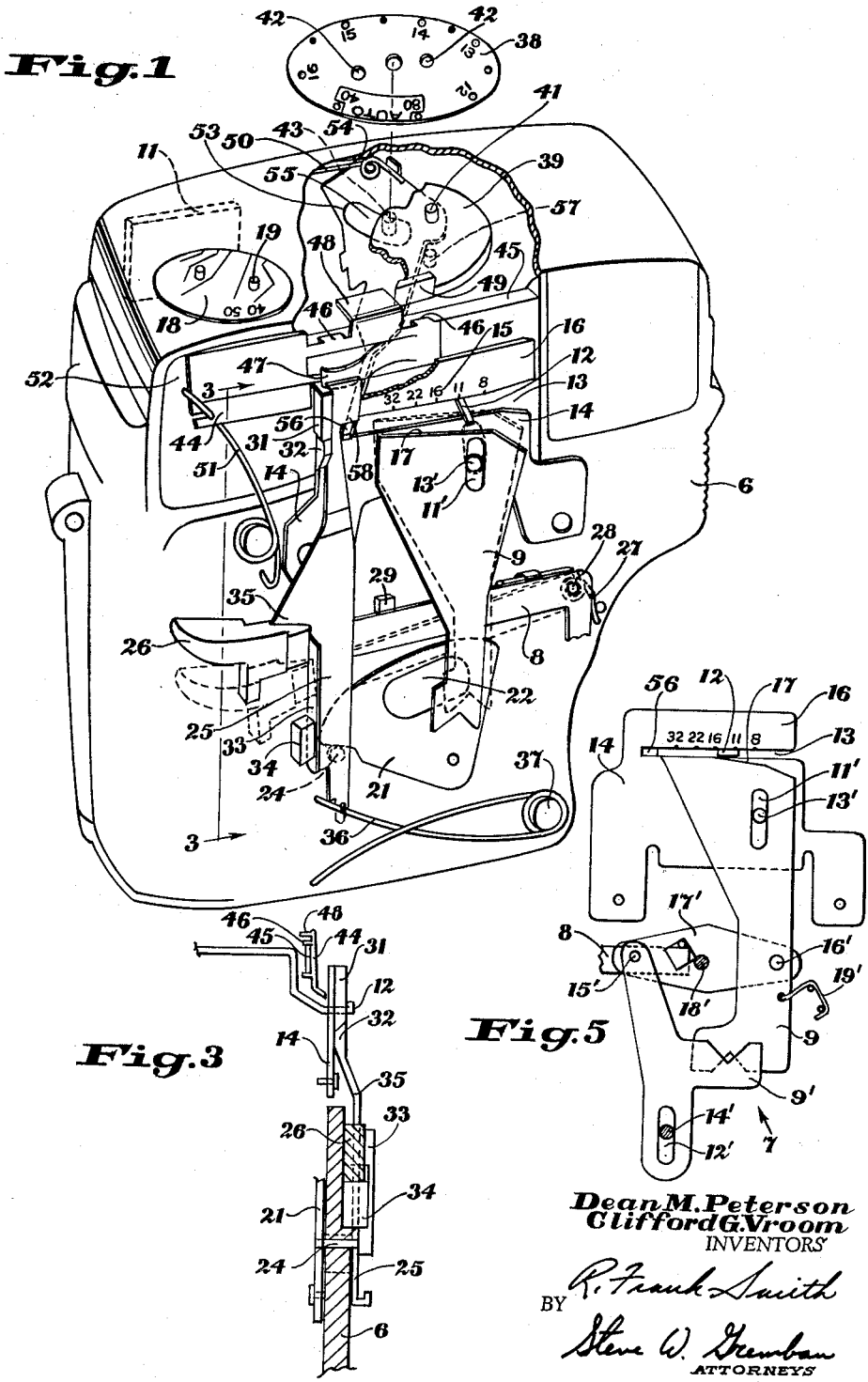
Dean M. Peterson
Clifford G. Vroom
INVENTORS
BY R. Frank Smith
Steve W. Gremban
ATTORNEYS Oct. 8, 1963 D. M. PETERSON ETAL 3,106,144
CAMERA
Filed Aug. 5, 1960 2 Sheets-Sheet 2
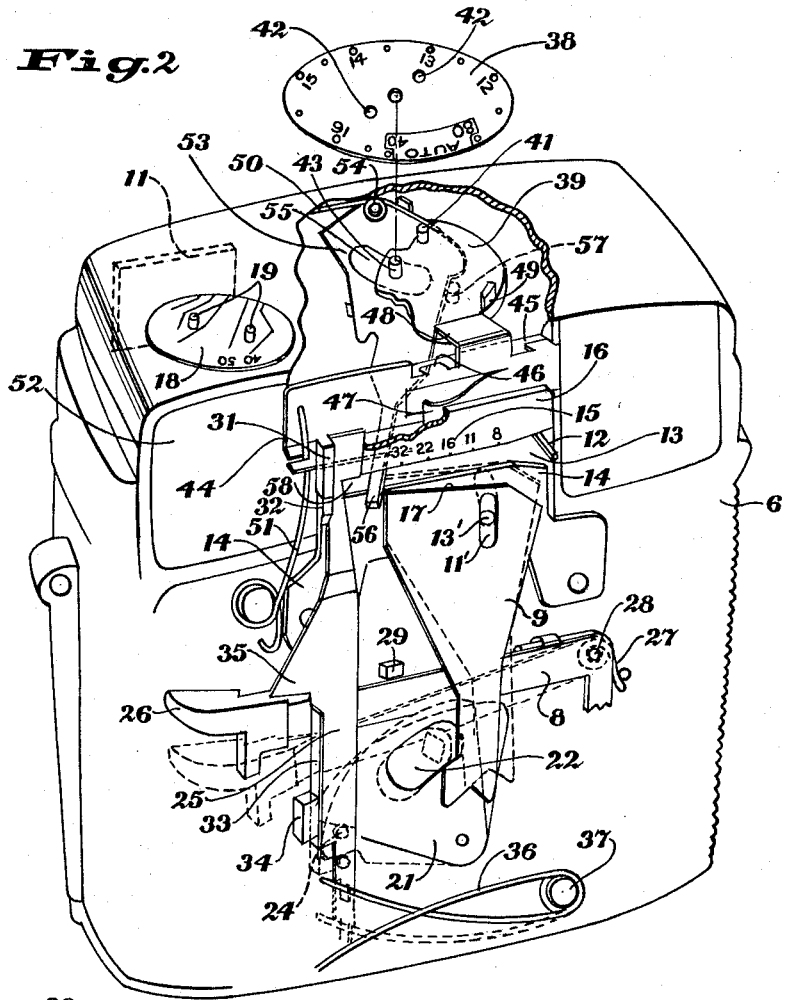
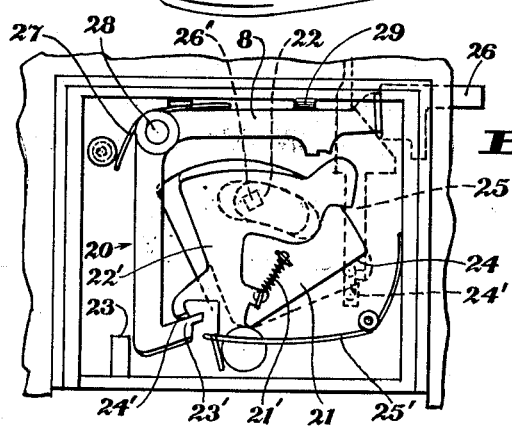
Dean M. Peterson
Clifford G. Vroom
INVENTORS
BY
ATTORNEYS

United States Patent Office 3,106,144
Patented Oct. 8, 1963

3,106,144
CAMERA
Dean M. Peterson and Clifford G. Vroom, Rochester,
N.Y., assignors to Eastman Kodak Company, Rochester, N.Y., a corporation of New Jersey
Filed Aug. 5, 1960, Ser. No. 47,648
18 Claims. (Cl. 95—64)

This invention relates generally to cameras, and more specifically to an improved box type camera having two exposure settings of different time duration.

In camera operation, particularly in inexpensive box-type cameras, the speed of exposure is normally set at around 1/40 of a second. At this speed setting, it is possible to vary the diaphragm opening within predetermined limits to compensate for the particular light condition under which the exposure is being made. One of the disadvantages of a single speed setting of 1/40 of a second is that the operator may move the camera before the exposure is completed resulting in photographs that are unsatisfactory for the reason that they show camera motion. This exposure period of 1/40 sec. is necessary, however, for flash bulb use to provide sufficient time for the illumination to build up to a maximum for proper synchronization of the camera. In this invention, an improved inexpensive box-type camera is disclosed that is capable of automatic operation in which case the diaphragm automatically adjusts to the light condition under which the exposure is being made at either of two settings of 1/40 and 1/80 seconds, and manual operation in which case the diaphragm is manually controlled by the operator to compensate for the light condition under which the exposure is being made at the single exposure setting of 1/40 second.

One of the primary objects of the present invention is to provide an inexpensive box-type camera adapted to substantially eliminate unsatisfactory photographs resulting from camera movement while the exposure is being made.

Another object of the invention is to provide an inexpensive box-type camera having two exposure settings of different time duration and in which the diaphragm aperture may be automatically adjusted for each setting in response to variations in the brightness of the scene or object which is to be photographed.

Still another object of this invention is to provide an improved inexpensive box-type camera in which the diaphragm aperture is automatically adjusted in response to variations in the brightness of the scene or object which is to be photographed for either of two exposure settings of different duration, and the diaphragm aperture is manually adjustable at only one of the exposure settings.

A further object of this invention is to provide an improved inexpensive box-type camera that is of simple design and construction, thoroughly reliable and efficient in operation, and economical to manufacture.

Still another object of the invention is to provide an improved inexpensive box-type camera in which movement of a single member simultaneously changes the exposure speed setting, and adjusts the size of an aperture through which light passes to a photosensitive device for regulating the diaphragm aperture in response to variations in the brightness of the scene or object to be photographed.

Objects and advantages other than those set forth above will be apparent from the following description when read in connection with the accompanying drawings, in which:

FIG. 1 is a front elevation view in perspective of a camera incorporating a preferred embodiment of the invention and having a portion of the camera broken away and a dial shown in exploded relation thereto at an exposure speed setting of 1/80 second;

FIG. 2 is a view similar to FIG. 1 showing the camera parts with the control dial at an exposure speed setting of 1/40 second;

FIG. 3 is a segmental view taken substantially along line 3—3 of FIG. 1;

FIG. 4 is a side elevation view of the shutter mechanism incorporated in the camera of this invention; and FIG. 5 is a side elevation view of the diaphragm mechanism of the camera.

As shown in the drawings, a preferred form of the invention is embodied in a box-type camera 6 of the normal type having an adjustable diaphragm 7 as seen in FIG. 5 consisting of two blades 9, 9' that are moved apart when a shutter operating lever 8 is manually actuated. The blades 9, 9' have respective slots 11', 12' through which the blades are guided for vertical movement by respective pins 13', 14'. Blades 9, 9' are pivotally linked at 15' and 16' to a rocking lever 17' which is pivoted at 18' to couple the two blades together for opposed linear movement. A light spring 19' is secured to blade 9 and urges the latter upward, thereby tending to rock lever 17' counterclockwise for moving blade 9' downward. A pair of notches on blades 9, 9' cooperate in axial alignment with the lens system of the camera to form a cats-eye diaphragm 7 whose aperture area depends upon the vertical positions of blades 9, 9'. The diaphragm opening may be established either automatically as a function of scene brightness, or manually in which case the opening is independent of the scene brightness. The camera 6 further has a photoelectric cell 11 electrically connected to an electrical measuring instrument of the conventional galvanometer type, not shown, whose angular position is a function of the degree of energization of the instrument by cell 11. The light measuring instrument has a pointer 12 that swings in a slot 13 formed by a plate 14 secured to camera 6. The pointer 12 cooperates with an aperture scale 15 provided on a diaphragm anvil 16 of plate 14 to indicate the diaphragm opening corresponding to the instantaneous scene brightness and further acts as a stop for inclined end 17 of blade 9 for determining the correct size of the diaphragm opening. The sensitivity of photoelectric cell 11 may be adjusted for changes in film speed in a well known manner by rotating a pair of thin, rectangular baffle members, not shown, mounted in front of cell 11 by means of a disc 18. The disc 18 is located on the outer surface of camera 6 and carries spaced indicia 18' which are graduated in any convenient system of film-speed values and which cooperate with a fixed index mark, not shown. The disc 18 has pins 19 extending therefrom to form a manual grip for rotating disc 18 and the baffle members.

The diaphragm structure 9, photoelectric cell 11 and measuring instrument has been referred to only generally since this mechanism is only environmental with respect to the invention, and further is disclosed in greater detail in a copending U.S. patent application, Serial No. 796,309, by Miller R. Hutchison, Jr. et al., filed March 2, 1959, now Patent No. 2,999,441.

The camera 6 further has an over-center shutter mechanism 20 shown in FIG. 4 of the type disclosed in complete detail in U.S. Patent 2,874,624. Shutter mechanism 20 has a pivotally mounted shutter blade 21 with the usual exposure aperture 22 therein. A spring 21' is interposed between shutter blade 21 and a pivotal camera coverblind lever 22', and in one position of the coverblind 22' urges blade 21 in a counter clockwise direction as seen in FIG. 4 against a stop 23 formed by camera 6. In the position of the coverblind 22' shown in FIG. 4, spring 21' urges shutter blade 21 in a clockwise direction as seen in FIG. 4 against a stop pin 24 laterally extending from a reciprocally movable lever 25. The shutter operating lever 8 is rotatably mounted on a pin 28 of camera 6, and has an operating handle 26 provided at one end thereof. A spring 27 mounted on pin 28 constantly urges shutter operating lever 8 in a counterclockwise direction as seen in FIG. 4 up against a suitable stop 29 formed by camera 6. When shutter operating lever 8 is depressed by the camera operator, a hook 23' formed thereby releases an ear 24' of coverblind 22' whereupon coverblind 22' is urged by its spring 25' in a counterclockwise direction as seen in FIG. 4 causing shutter spring 21' to urge shutter blade 21 in the same direction against stop 23 to make an exposure. The lever 25 is guided for reciprocal movement by a U-shaped flange 31 slidably mounted on a complementary rib 32 formed by plate 14. The lever 25 further has a lip 33 that slidably engages a shoulder 34 formed by camera 6, and an arm 35 whose bottom edge is urged into engagement with handle 26 by means of a spring 36 mounted on pin 37.

As seen in FIG. 4, the shutter blade aperture 22 extends over the diaphragm aperture 26'. If shutter blade 21 is released from its position against stop 24 as seen in full lines in FIG. 4, the shutter mechanism 20 is designed to provide an exposure of $\frac{1}{80}$ second. If pin 24 is moved by a means to be explained hereinafter into the dotted position shown in FIG. 4, it is obvious that shutter blade 21 which is held thereagainst by spring 21' will have to travel a greater distance when released. Consequently, aperture 26' will be uncovered for a longer period of time resulting in a longer exposure, and the position of pin 24 and other shutter parts are properly designed to provide an exposure of $\frac{1}{40}$ second at this new setting.

The camera further has an exposure value scale disc 38 on its outer surface secured to a cam 39 by means of pins 41 laterally extending from cam 39 through complementary openings 42 formed by disc 38. The pins 41 form a grip means by which disc 38 and cam 39 may be turned about a shaft 43 carried by camera 6. The scale disc 38 has a portion designated "Automatic" having a numeral 80 at one end, and the numeral 40 at the other. When disc 38 is turned to align numeral 80 with an index mark, not shown, camera 6 is set for automatic operation at a $\frac{1}{80}$ second exposure. When the scale is turned to align the numeral 40 with the index mark, camera 6 is set for automatic operation at $\frac{1}{40}$ second exposure. Further turning of the scale in a counterclockwise direction aligns the indicia 16–12 on the disc with the index mark for manual setting of the diaphragm at an exposure setting of $\frac{1}{40}$ second. A baffle 44 is slidably mounted on a bar 45 formed by camera 6 and is guided for reciprocal movement by bent ears 46 engaging sides of bar 45. Baffle 44 is held on bar 45 by means of a spring finger 47 struck out of baffle 44 and engaging the back surface of anvil 15. Baffle 44 has a lip 48 engageable by a projection 49 formed by cam 39 for reciprocally moving baffle 44 into the light path of photoelectric cell 11. A spring 51 constantly urges baffle 44 to the right as seen in FIG. 1. The purpose of baffle 44 is to control the size of an opening 52 through which light passes to photoelectric cell 11. For automatic operation, the exposure meter is designed so that with opening 52 unobstructed by baffle 44, pointer 12 will cooperate with inclined end 17 of blade 9 and anvil 15 to automatically provide the proper diaphragm opening for an exposure of $\frac{1}{40}$ second. Now if the exposure is changed to $\frac{1}{80}$ second, the diaphragm opening required is twice as large. To automatically accomplish this, baffle 44 is interposed in the light path blocking part of opening 52 whereupon pointer 12 will move to the right as seen in FIG. 1. The size of baffle 44 has been properly designed so that pointer 12 will move the correct amount to provide the proper diaphragm opening for an exposure of $\frac{1}{80}$ second.

A lever 53 pivoted about a stud 54 of camera 6 is interposed between the camera body and cam 39, and has a slot 55 through which shaft 43 extends. Lever 53 is urged by a spring 50 in a counterclockwise direction as seen in FIG. 1 into engagement with a lug 57 carried by cam 39. The lever 53 has an arm 56 extending through slot 13 and is adapted to cooperate with inclined end 17 of diaphragm blade 9 to form a stop for manually setting the diaphragm aperture during manual operation. When exposure scale disc 38 is moved to the automatic exposure setting of $\frac{1}{80}$ second as seen in FIG. 1, arm 56 is engaged by lug 57 and moved underneath a shoulder 58 formed by lever 25 to form a latch for lever 25. Since arm 56 is clear of inclined end 17 of blade 9, the diaphragm aperture is automatically set by the position of pointer 12 which forms a stop for inclined end 17. In this $\frac{1}{80}$ second exposure position, when camera operating lever 8 is depressed to make an exposure, lever 25 is prevented from moving downwardly by arm 56 so that shutter blade 21, when operated, moves through an angular distance determined by pin 24 in its full line position of FIG. 4, and stop 23 which results in an exposure of $\frac{1}{80}$ second. When camera 6 is in the automatic position at an exposure setting of $\frac{1}{40}$ second as seen in FIG. 2, arm 56 is clear of both blade 9 and shoulder 58 so that when camera operating lever 8 is depressed to make an exposure, lever 25 is carried downwardly by spring 36 as shown dotted in FIG. 2. The pin 24 is moved downwardly along with lever 25 into its dotted position seen in FIG. 4, and shutter blade 21, which is urged by its spring 21' against pin 24 follows pin 24 so that when an exposure is made, shutter blade 21 travels through an angular distance that is greater than the distance at the $\frac{1}{80}$ second exposure setting resulting in the slower exposure of $\frac{1}{40}$ second.

In summary, with the exposure value scale disc 38 set at the automatic "80" setting as seen in FIG. 1, arm 56 is underneath shoulder 58 of lever 25 and baffle 44 has been urged by lug 49 into the light path of photoelectric cell 11. The camera 6 is then in a position for automatic operation at an exposure speed setting of $\frac{1}{80}$ second in which the diaphragm aperture is automatically determined by the position of pointer 12 whose angular position is determined by the degree of energization of the measuring instrument by photoelectric cell 11. The size of the diaphragm aperture is determined by inclined end 17 of diaphragm blade 9 engaging pointer 12. Moving the exposure value scale disc 38 from the automatic "80" setting to the automatic "40" setting by moving disc 38 in a counterclockwise direction, causes arm 56 to be urged by its spring 50 to a position where it is clear of lever shoulder 58 and inclined end 7 of diaphragm blade 9. Furthermore, baffle 44 is urged by its spring 51 against its stop out of the light path to photoelectric cell 11. Furthermore movement of the exposure value scale disc 38 in a counterclockwise direction to any of the settings indicated thereon positions arm 56 along anvil 15 to a corresponding setting, independently of the scene brightness, and in the path of inclined end 17 of diaphragm blade 9. During manual operation, it is arm 56 engageable by inclined end 17 of diaphragm blade 9 that determines the size of the diaphragm aperture. During automatic operation, arm 56 is moved clear of inclined end 17 of blade 9, and pointer 12 engageable by inclined end 17 of blade 9 automatically determines the diaphragm aperture size.

The invention has been described in detail with particular reference to a preferred embodiment thereof, but it will be understood that variations and modifications can be effected within the spirit and scope of the invention as described hereinabove and as defined in the appended claims.

We claim:

1. In a camera provided with an exposure aperture, the combination comprising: a shutter member; drive means operable when actuated to drive said shutter member relative to said aperture to uncover and then cover said aperture to make an exposure; an actuating member movable between rest and actuating positions for actuating said drive means; stop means co-operating with said shutter member and movable between first and second positions to achieve corresponding first and second exposure durations upon actuation of said drive means to make an exposure; latch means for said stop means and movable between a latched position for latching said stop means in its first position for achieving said first exposure duration upon making an exposure, and an unlatched position in which it frees said stop means; and means interrelating said actuating member and said stop means and operable when said latch means is in said unlatched position to allow movement of said stop means from its first position to its second position in response to movement of said actuating member from its rest position to its actuating position for achieving said second exposure duration.

2. The invention according to claim 1 wherein said shutter member comprises a shutter blade and said stop means comprises a pin engageable by said blade.

3. The invention according to claim 1 wherein said shutter member comprises a shutter blade, and said stop means comprises a slide member having a pin engageable by said blade.

4. The invention according to claim 1 wherein said shutter member comprises a pivotal shutter blade, and said stop means comprises a reciprocally movable slide member having a pin engageable by said blade.

5. The invention according to claim 4 wherein said interrelating means comprises a projection formed by said slide member biased into engagement with said actuating member and movable therewith when said latch is in its unlatched position.

6. The invention according to claim 5 wherein said projection is engageable with an abutment formed by said actuating member, and a spring urges said projection into engagement with said abutment.

7. The invention according to claim 5 wherein said latch means comprises an arm movable into the path of a shoulder formed by said slide member for preventing said slide member from following said actuating member as it is moved to its actuating position.

8. In an automatic camera provided with diaphragm and exposure apertures, the combination comprising: a diaphragm mechanism operable when actuated to adjustably vary the size of said diaphragm aperture; a light-sensitive exposure meter including a photocell for actuating said diaphragm mechanism to automatically control the size of said diaphragm aperture in accordance with the light striking said photocell; a baffle for controlling the size of an opening through which light passes to said photocell, and movable between an open position clear of said opening, and a closed position blocking said opening; a shutter member; drive means operable when actuated to drive said shutter member relative to said exposure aperture to uncover and then cover said aperture to make an exposure; an actuating member movable between rest and actuating positions for actuating said drive means; stop means co-operating with said shutter member and movable between first and second positions to achieve corresponding first and second exposure durations; latch means for said stop means and movable between a latched position for latching said stop means in its first position for achieving said first exposure duration upon making an exposure, and an unlatched position in which it frees said stop means; means interrelating said actuating member and said stop means and operable when said latch means is in said unlatched position to allow movement of said stop means from its first position to its second position in response to movement of said actuating member from its rest position to its actuating position for achieving said second exposure duration; and control means for said latch means and baffle for simultaneously moving said latch means to its latching position and said baffle to its closed position.

9. The invention according to claim 8 wherein said shutter member comprises a shutter blade, and said stop means comprises a pin engageable by said blade.

10. The invention according to claim 8 wherein said shutter member comprises a shutter blade, and said stop means comprises a slide member having a pin engageable by said blade.

11. The invention according to claim 8 wherein said shutter member comprises a pivotal shutter blade, and said stop means comprises a reciprocally movable slide member having a pin engageable by said blade.

12. The invention according to claim 11 wherein said interrelating means comprises a projection formed by said slide member biased into engagement with said actuating member and movable therewith when said latch is in its unlatched position.

13. The invention according to claim 12 wherein said projection is engageable with an abutment formed by said actuating member, and a spring urges said projection into engagement with said abutment.

14. The invention according to claim 12 wherein said latch comprises an arm movable into the path of a shoulder formed by said slide member for preventing said slide member from following said shutter operating member as it is moved to its operative position.

15. The invention according to claim 8 wherein said baffle comprises a reciprocally movable substantially rectangular plate biased towards said control means.

16. The invention according to claim 15 wherein said plate has a spring finger in engagement with an anvil formed by said diaphragm mechanism.

17. The invention according to claim 8 wherein said baffle comprises a reciprocally movable substantially rectangular plate having a lip and is biased by a spring into its open position, and said control means comprises a rotatable cam having a projection adapted to engage said lip and urge said plate into its closed position against the bias of its spring.

18. The invention according to claim 8 wherein said shutter member comprises a pivotal shutter blade; said stop means comprises a reciprocally movable slide member having a pin engageable by said shutter blade, said interrelating means comprises a projection formed by said slide member and biased by a spring into engagement with an abutment formed by said actuating member; said latch comprises a shoulder formed by said slide member and an arm movable into the path of said shoulder; said baffle comprises a reciprocally movable substantially rectangular plate having an ear and is biased by a spring into its open position; and said control means comprises a rotable cam having a projection adapted to engage said ear for urging said plate into its closed position against the bias of its spring, said cam further having a lug adapted to engage said arm for moving said arm into the path of said shoulder.

References Cited in the file of this patent

UNITED STATES PATENTS

| | | |
|---|---|---|
| 2,420,597 | Hutchison | May 13, 1947 |
| 2,874,624 | Marvin | Feb. 24, 1959 |
| 2,956,491 | Fischer | Oct. 18, 1960 |
| 2,995,075 | Eburn et al. | Aug. 8, 1961 |
| 3,033,092 | Ernisse et al. | May 8, 1962 |